(12) United States Patent
Chen et al.

(10) Patent No.: US 11,455,404 B2
(45) Date of Patent: Sep. 27, 2022

(54) DEDUPLICATION IN A TRUSTED EXECUTION ENVIRONMENT

(71) Applicant: Red Hat, Inc., Raleigh, NC (US)

(72) Inventors: Huamin Chen, Westboro, MA (US); Michael Bursell, Halstead (GB)

(73) Assignee: RED HAT, INC., Raleigh, NC (US)

( * ) Notice: Subject to any disclaimer, the term of this patent is extended or adjusted under 35 U.S.C. 154(b) by 204 days.

(21) Appl. No.: 16/885,395

(22) Filed: May 28, 2020

(65) Prior Publication Data
US 2021/0374253 A1 Dec. 2, 2021

(51) Int. Cl.
*G06F 21/60* (2013.01)
*H04L 9/06* (2006.01)
*G06F 16/215* (2019.01)
*H04L 9/40* (2022.01)

(52) U.S. Cl.
CPC .......... *G06F 21/602* (2013.01); *G06F 16/215* (2019.01); *H04L 9/0643* (2013.01); *H04L 63/0281* (2013.01); *G06F 2221/2149* (2013.01)

(58) Field of Classification Search
CPC .................................................... G06F 21/602
See application file for complete search history.

(56) References Cited

U.S. PATENT DOCUMENTS

| 8,117,464 B1 | 2/2012 | Kogelnik |
| 8,401,185 B1 | 3/2013 | Telang |
| 8,898,119 B2 | 11/2014 | Sharma et al. |
| 9,495,552 B2 | 11/2016 | El-Shimi et al. |
| 10,528,751 B2 | 1/2020 | Li et al. |
| 10,559,202 B2 | 2/2020 | Yang et al. |
| 2020/0213109 A1* | 7/2020 | Perlman ................. G06F 16/174 |
| 2021/0191880 A1* | 6/2021 | Ki ........................... G06F 21/602 |
| 2021/0271763 A1* | 9/2021 | Perlman .............. G06F 21/6245 |

OTHER PUBLICATIONS

Bellare M., et al., "DupLESS: Server-Aided Encryption for Deduplicated Storage," University of California, San Diego, University of Wisconsin-Madison, 2013, https://eprint.iacr.org/2013/429.pdf.
Puzio, Pasquale, et al., "ClouDedup: Secure Deduplication with Encrypted Data for Cloud Storage," SecludIT and EURECOME, http://www.eurecom.fr/fr/publication/4136/download/rs-publi-4136.pdf.

* cited by examiner

*Primary Examiner* — Simon P Kanaan
(74) *Attorney, Agent, or Firm* — Kilpatrick Townsend & Stockton LLP

(57) ABSTRACT

Aspects and features of the present disclosure can provide a trusted, privacy-preserved deduplication process by executing deduplication functions in a trusted execution environment (TEE). In some examples, encrypted, incoming user data blocks are decrypted in the TEE to produce unencrypted user data blocks. An incoming digital fingerprint or each unencrypted user data block is produced. A processing device can compare the incoming digital fingerprint to existing digital fingerprints stored in the TEE to determine a presence of the incoming digital fingerprint and hence the presence of a copy of the data block in the storage platform, and writes the encrypted. Incoming data blocks are written to storage only when necessary. The technique allows public mass storage systems to meet cybersecurity objectives while achieving the storage space efficiency that deduplication provides.

17 Claims, 5 Drawing Sheets

DEDUPLICATION IN A TRUSTED EXECUTION ENVIRONMENT

TECHNICAL FIELD

The present disclosure relates generally to deduplication of data stored in a public storage system. More specifically, but not by way of limitation, this disclosure relates to cybersecurity measures to maintain data privacy for users while performing deduplication of stored user data in a public storage system.

BACKGROUND

Some mass storage systems are configured to continuously deduplicate stored data in order to minimize storage space and costs, and to improve the processing efficiency of accessing data records. When a user adds a new data block to the storage system, a calculation is performed on the data block and a unique fingerprint is created. The fingerprint is compared to those in a database stored on the server managing the storage. If the fingerprint is found, meaning the data block is verified to be identical to an existing data block, the new data block is not written into the storage system, but rather references to the data block are updated. Thus, space is not wasted storing the duplicate data block over again for another record.

DETAILED DESCRIPTION

Figure 1:
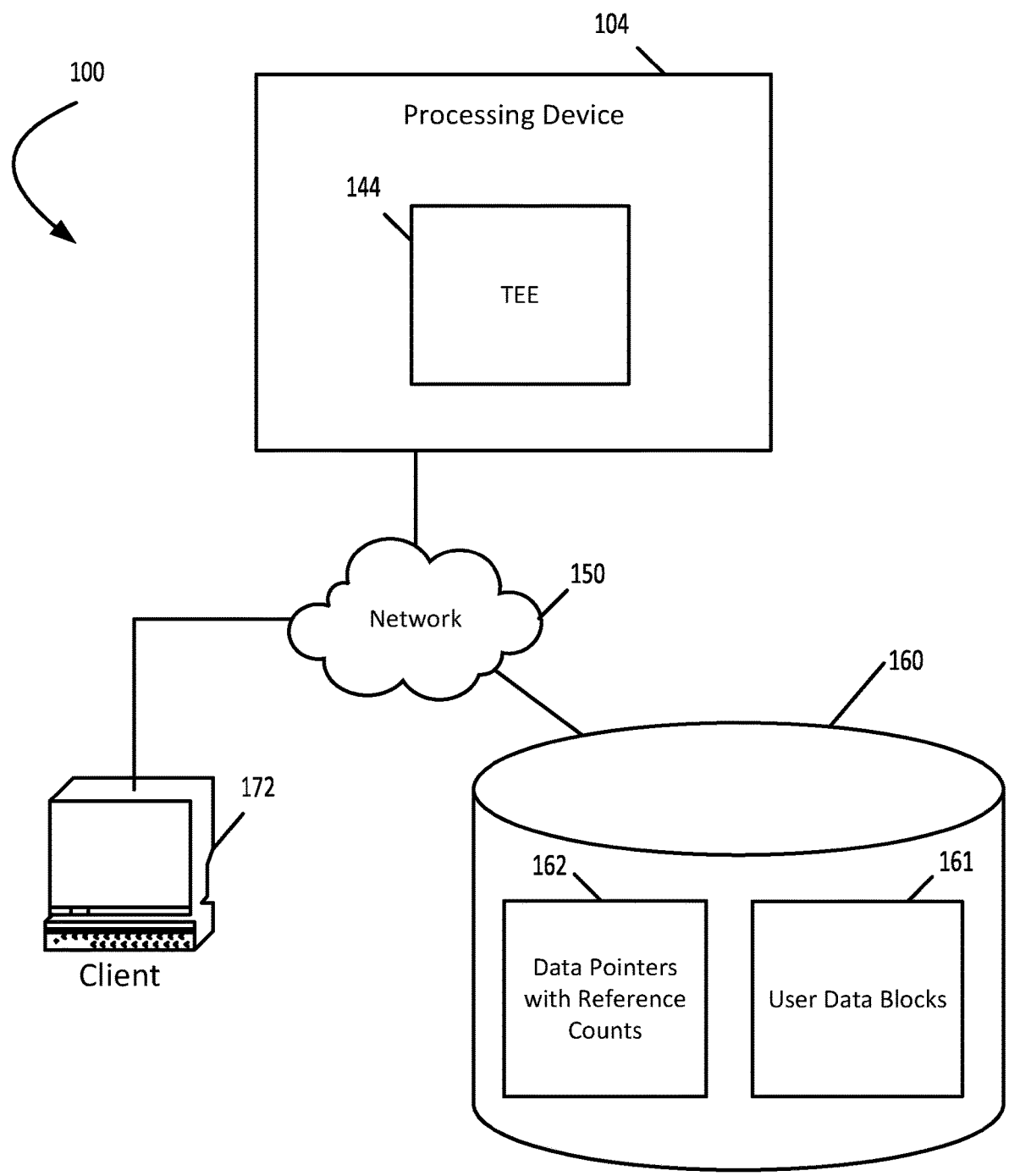
FIG. 1 is a block diagram of an example of a system that provides deduplication for a storage platform according to at least some aspects of the disclosure.

A mass storage system can be configured to deduplicate stored data in order to minimize storage space and costs, and to improve the processing efficiency of accessing data records. However, data deduplication is not widely implemented in public mass storage systems because most of the data blocks stored by tenants (customers who rent or purchase storage space) are encrypted, and at least some fingerprinting algorithms used to detect duplicate data blocks do not work with encrypted data blocks. The owner of a public mass storage system cannot decrypt tenant data blocks for deduplication in its servers, since doing so would violate tenants' expectations of privacy, and may violate cyber security laws. Public mass storage systems therefore cannot typically achieve the same storage space efficiency as private mass storage systems.

Some examples of the present disclosure overcome one or more of the issues mentioned above through a trusted, privacy-preserved deduplication process. Deduplication can be accomplished by executing deduplication functions in a trusted execution environment (TEE), so as to mitigate risks of information leak or misuse. The TEE is not tied to a particular server but runs in a secure enclave inside a processor that has access to the storage platform. Data can be first chunked into fixed sizes, called data blocks. A digital fingerprint can be obtained, for example, through a collision-free or nearly collision-free hashing function that generates a hash value to serve as the digital fingerprint. Digital fingerprints for previously stored data blocks can be stored in a database. When a new data block is to be added to the mass storage system, its fingerprint can be compared to those in the database. If the fingerprint matches one from the database, the data block can be treated as verified to be identical to an existing data block. In this case, the new data block is not necessarily duplicated, that is, is not necessarily written into the storage system. Instead, a reference count can be added the data pointer in the storage system for the data block.

By externalizing the fingerprinting process in a TEE instead of in the storage platform, the data blocks can be decrypted and fingerprinted without leaking or misusing tenants' data, even if the storage platform were compromised. Storage efficiency of the public mass storage system can be improved while data confidentiality and integrity are maintained.

In some examples, a processing device performing deduplication can decrypt, within a TEE, incoming user data blocks destined for a storage platform, which are received from a client. The incoming user data blocks can be decrypted to produce unencrypted user data blocks. An incoming digital fingerprint or each unencrypted user data block can be produced. The processing device can compare the incoming digital fingerprint to existing digital fingerprints stored in the TEE to determine a presence of the incoming digital fingerprint and hence the presence of a copy of a data block in the storage platform. The system can deduplicate the encrypted, incoming user data block for the storage platform when the incoming digital fingerprint is present. In some examples, the data block is stored by updating a data pointer for the existing data block that corresponds to the incoming digital fingerprint.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for providing deduplication according to some aspects of the disclosure. The system 100 includes the processing device 104 that can execute computer program code, also referred to as instructions, program code, or program code instructions. These instructions are executable by the processing device to perform the operations of deduplication as described herein. The processing device 104 can include one processing device or multiple processing devices. Non-limiting examples of the processing device 104 include a field-programmable gate array (FPGA), an application-specific integrated circuit (ASIC), a microprocessor, an embedded processor, a digital signal processor, etc.

Processing device 104 includes a trusted execution environment (TEE) 144. The processing device 104 can execute one or more operations for deduplication and can maintain a trusted execution environment (TEE) in which at least some of those operations are executed. Alternatively, one processor can execute the high-level deduplication operations and another processor can maintain the TEE and perform the encryption and decryption within the TEE.

A TEE in this example is a secure enclave inside a processing device. Examples of processing device 104 with TEE 144 include AMD® devices with Secure Encrypted Virtualization (SEV) and Intel® processors with Software Guard Extensions (SGX). The processor that includes the TEE is one of the components of the system that can support multiple tenants of the storage platform. The TEE is not maintained by clients and its operation is transparent to clients. For these reasons, the TEE can be referred to as being associated with the storage platform.

Processing device 104 in FIG. 1 is connected to a network 150. Network 150 is in turn connected to mass storage platform 160. In some examples, mass storage platform 160 is a multitenant, public storage platform. Network 150 is also connected to client 172. Client 172 stores encrypted data in storage platform 160 by sending data over network 150. The data can be broken up into encrypted user data blocks 161. Storage platform 160 also includes data pointers with reference counts 162. A data pointer points to stored, encrypted, user data blocks 161 and a reference count is a numerical identifier that that identifies a tenant's use of a particular encrypted user data block. Network 150 can be any type of computer network. In some examples, network 150 can include a cloud network that deploys and manages application software and storage, the latter of which can be organized into a multitenant storage platform. As an example, network clusters as defined in the Kubernetes specification can be used.

Figure 2:
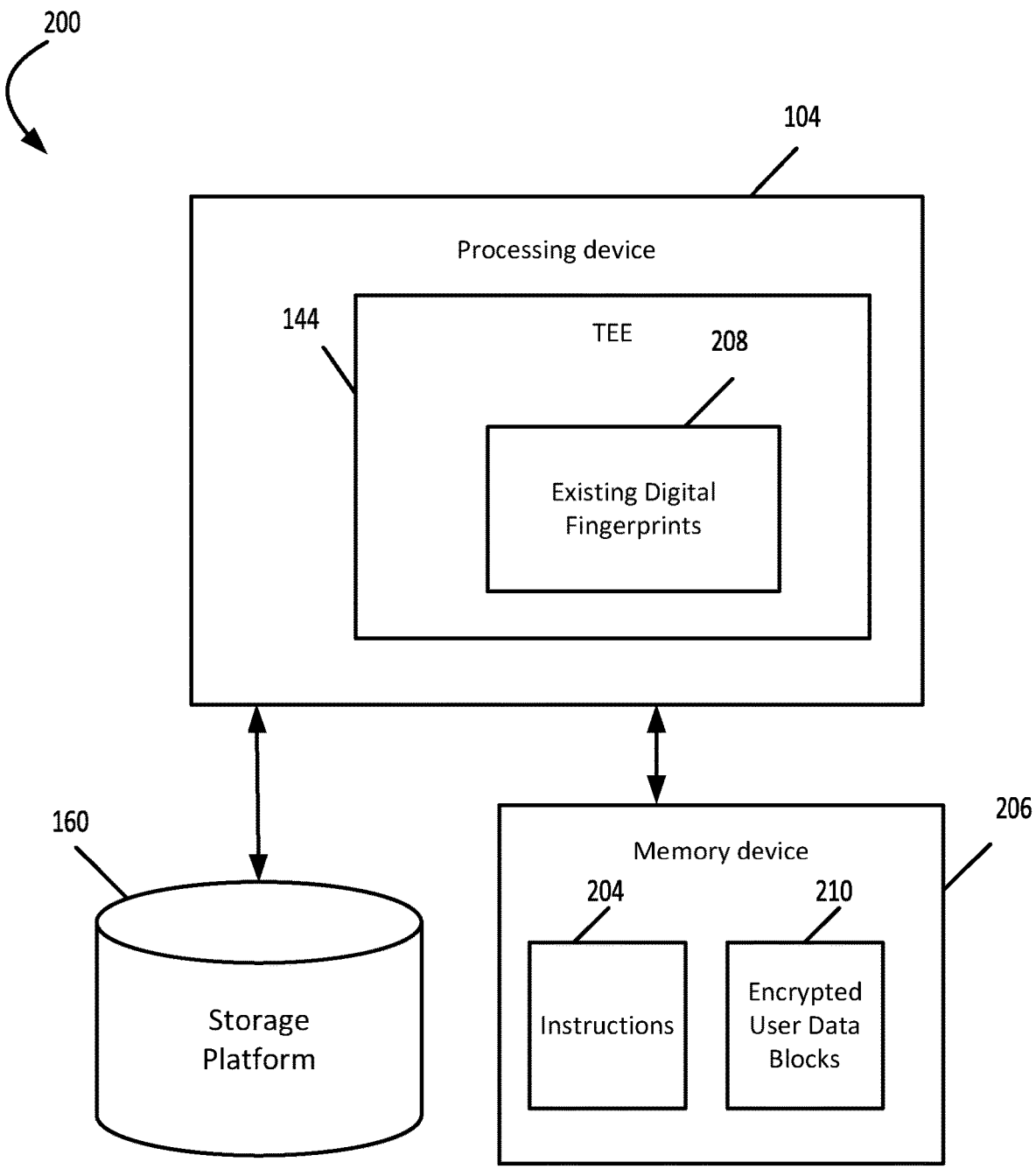
FIG. 2 is a block diagram of another example of a system that provides deduplication for a storage platform according to some aspects of the disclosure.

FIG. 2 is a block diagram of an example of a system 200 that provides deduplication according to some aspects of the disclosure. The system includes processing device 104 that can execute computer program code instructions 204, also referred to as instructions or program code instructions, for performing operations related to providing deduplication. In some examples, processing device 104 resides in a server. Such a server can serve as or be connected to the storage platform 160. Processing device 104 is communicatively coupled to a memory device 206.

The processing device 104 can execute one or more operations to provide deduplication. The processing device 104 can execute program code instructions 204 stored in the memory device 206 to perform the operations. In some examples, the instructions 204 include processor-specific instructions generated by a compiler or an interpreter from code written in any suitable computer-programming language, such as C, C++, C#, Python, etc. Processing device 104 includes TEE 144, which in turn includes a database 208 of existing digital fingerprints for reference when a new encrypted, incoming user data block is received. In the case of a storage platform implementing a multitenancy public storage system, the existing digital fingerprints in the database can correspond to tenant data blocks from multiple tenants Memory device 206 can include one memory device or multiple memory devices. The memory device 206 can be non-volatile and may include any type of memory device that retains stored information when powered off. Non-limiting examples of the memory device 206 include electrically erasable and programmable read-only memory (EEPROM), flash memory, or any other type of non-volatile memory. In some examples, at least some of the memory device can include a non-transitory computer-readable medium from which the processing device 104 can read instructions 204. A computer-readable medium can include electronic, optical, magnetic, or other storage devices capable of providing the processing device with computer-readable instructions 203 or other program code. Non-limiting examples of a computer-readable medium include magnetic disk(s), memory chip(s), ROM, random-access memory (RAM), an ASIC, a configured processor, optical storage, or any other medium from which a computer processor can read instructions 203.

The memory device 206 can also include one or more files and stored values. For example, memory device 206 can serve as a storage device for encrypted user data blocks 210. Encrypted user data blocks 210 can be stored temporarily in memory 206 for access by processing device 104 and TEE 144. Unencrypted user data blocks in this example remain in TEE 144 and are never shared with or stored in memory device 206.

Figure 3:
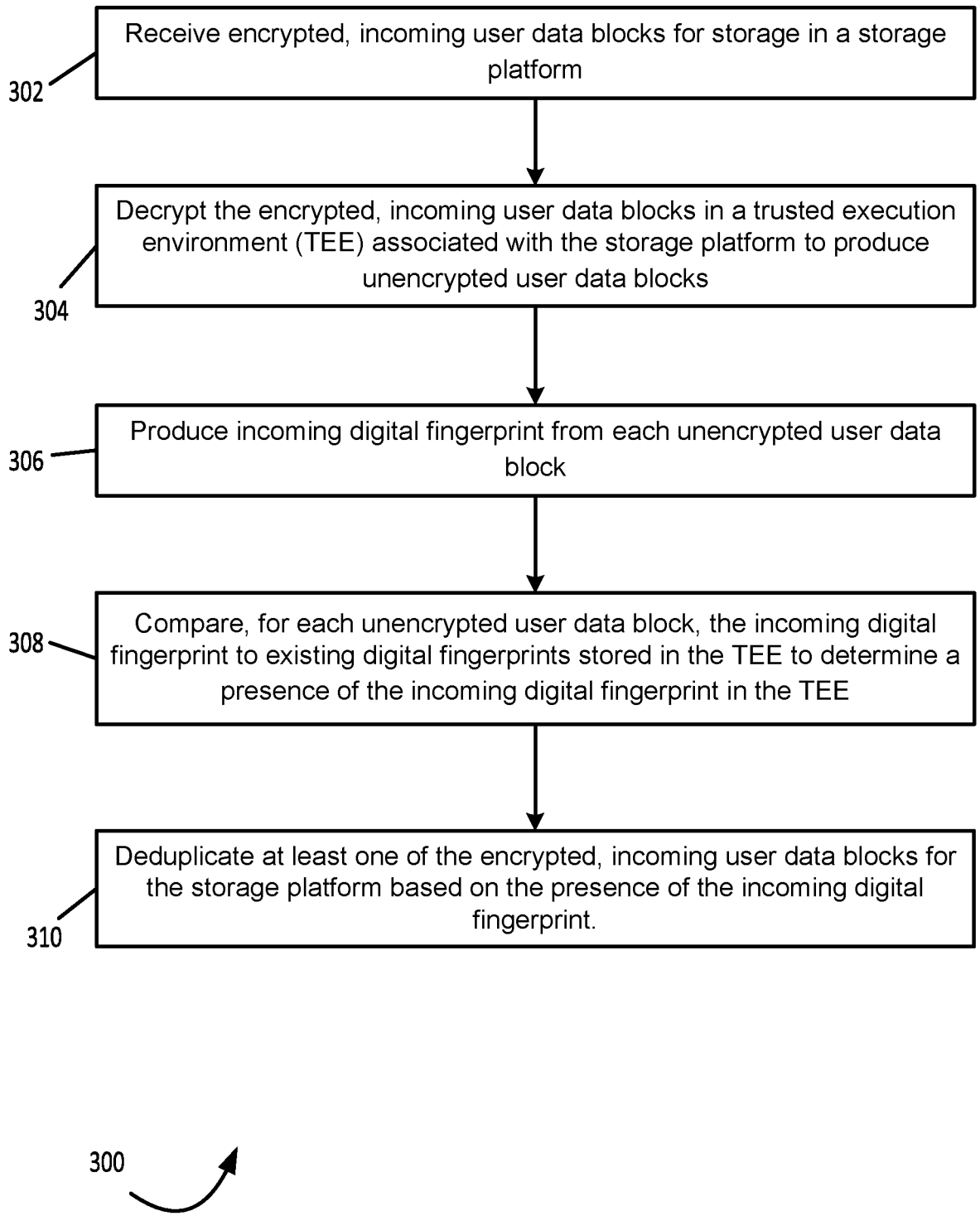
FIG. 3 is a flowchart of an example of a process for providing deduplication for a public storage platform according to some aspects of the disclosure.

In some examples, a computing device such as processing device 104 can perform one or more of the operations shown in FIG. 3 to provide deduplication for multitenancy public storage according to some aspects of the disclosure. In other examples, the processing device can implement more operations, fewer operations, different operations, or a different order of the operations depicted in FIG. 3. Process 300 of FIG. 3 is described below with reference to components discussed above.

At block 302, encrypted, incoming user data blocks are received for storage in storage platform 160. At block 304, processing device 104 decrypts the incoming user data blocks in TEE 144 to produce unencrypted user data blocks. TEE 144 is associated with storage platform 160 as opposed to being maintained by any tenants or clients. At block 306, computing device 104 produces an incoming digital fingerprint from each unencrypted user data block. At block 308, processing device 104 compares the incoming digital fingerprint for each unencrypted user data block to existing digital fingerprints in database 208 stored in TEE 144. Based on this comparison, processing device 104 can determine whether the incoming digital fingerprint is already present in TEE 144. At block 310, processing device 104 deduplicates the encrypted incoming user data block for the storage platform based on the presence of the incoming digital fingerprint.

If the incoming digital fingerprint is not present in database 208 of existing digital fingerprints, the encrypted incoming user data block is stored in the storage platform as received. At the same time, the digital fingerprint of the data block becomes part of the existing digital fingerprints in database 208.

In order to store the incoming data block without duplicating it, processing device 104 discards the data block without storing it. Instead, processing device 104 stores information to enable a user to recover the encrypted data block as previously stored when needed. In one example, the information is stored by adding a reference count to a data pointer in the storage platform. As one example of a data pointer, a pointer object can contain shared reference counts. The pointer object also contains a reference to the stored, encrypted data block.

Figure 4:
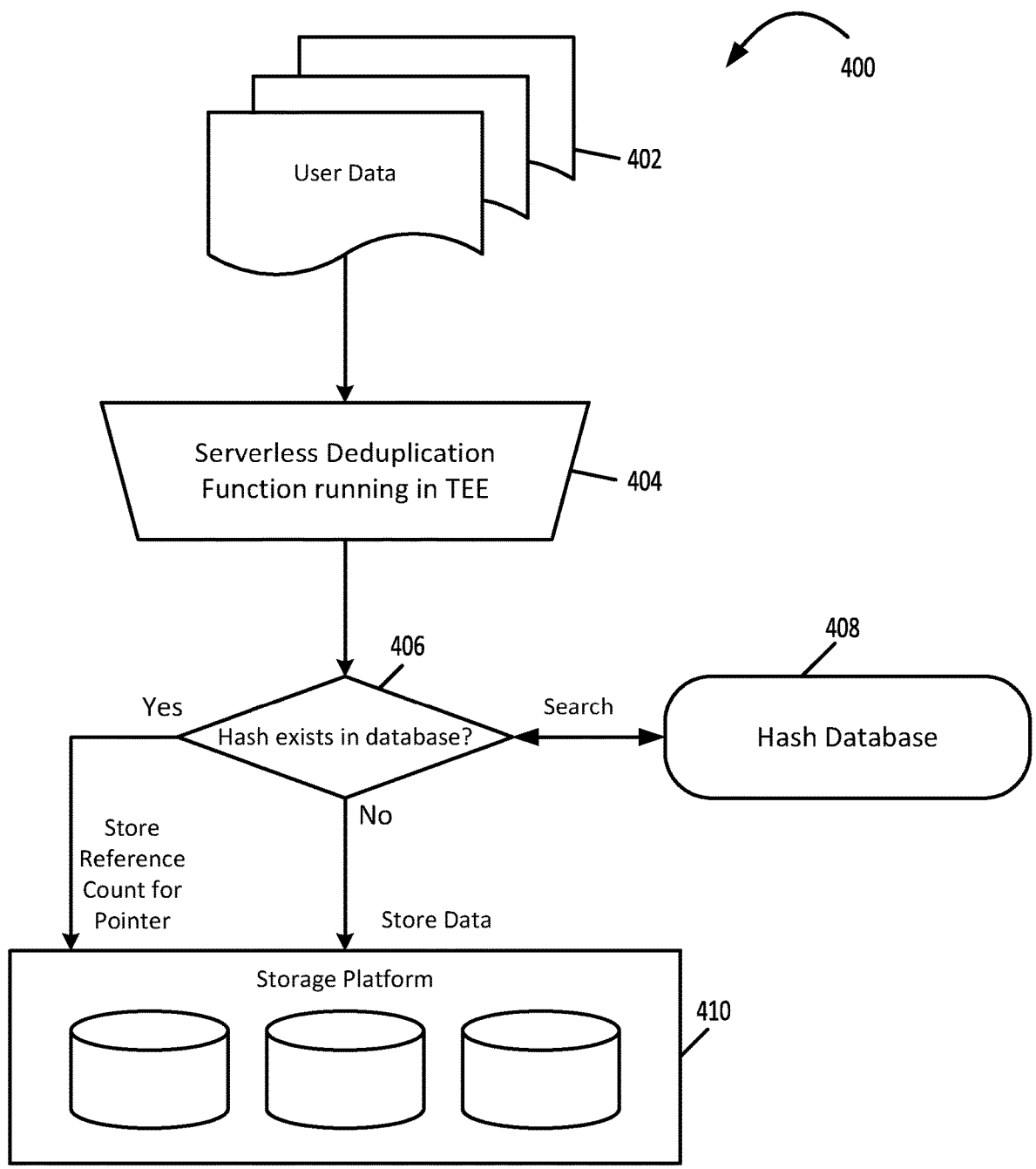
FIG. 4 is logic flow diagram of an example of a process for providing deduplication for a storage platform according to some aspects of the disclosure.

FIG. 4 is logic flow 400 of an example of a process for providing deduplication for public storage according to some aspects of the disclosure. In this example, fingerprints are hash values obtained through a collision free, or substantially collision free, hashing function. User data 402 is received by the serverless deduplication function 404 executed inside the TEE. Function 404 includes the substantially collision free hashing function. Function 404 can operate as a serverless function, meaning the function runs without having to provision a server in advance specifically for the function. A comparison function 406 determines whether the newly created hash exists in the existing fingerprint database. In this example, the existing fingerprint database is hash database 408. If the hash exists in the database, a reference count for the pointer is stored in storage platform 410. Otherwise the user data block itself is stored in storage platform 410.

In one example, the deduplication function can be architected as a serverless function. In this example, the serverless deduplication function 404 obtains the public decryption keys for user data blocks from a key management function (not shown) that makes use of the certificate-based asymmetric key pairs used to secure data communication sessions.

Figure 5:
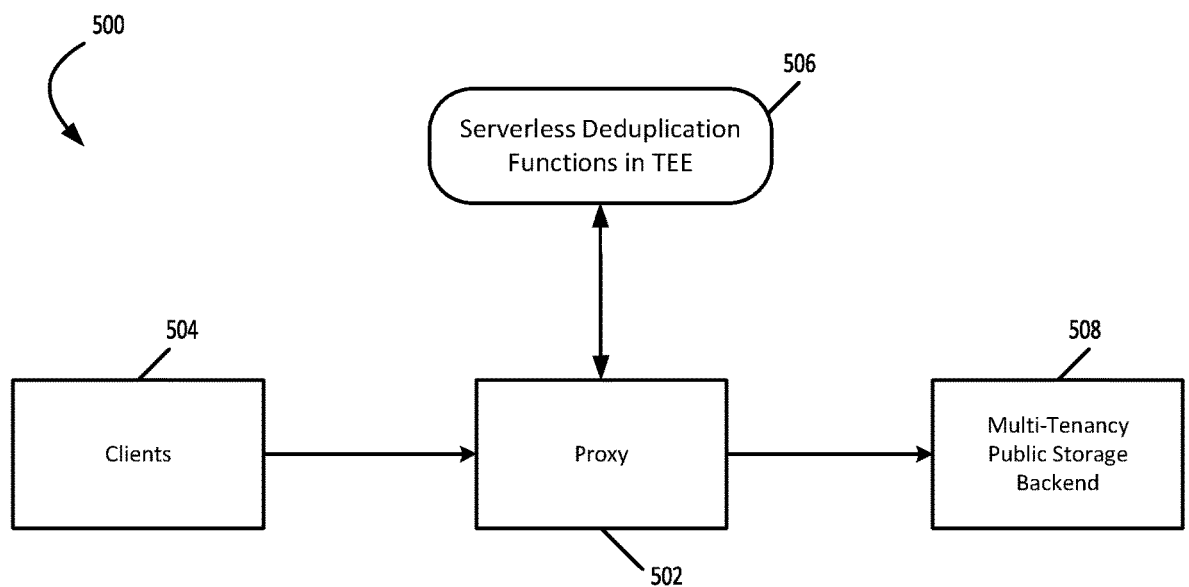
FIG. 5 is an entity flow diagram showing deduplication in a multitenant, public storage platform.

FIG. 5 is an entity flow diagram 500 showing deduplication in a multitenant public storage platform. In this example, much of the data deduplication logic is not an integral part of the storage system at all. Deduplication is instead executed inside a function or functions that can be directed by front-end proxy 502. In this example, the front-end proxy 502 handles protocol messaging to and from clients 504. The protocol is used to specify storage locations within a cloud network. The simple storage protocol, otherwise known as S3, is an example of such a protocol. When a client is to post a user data object, the proxy redirects the object to the serverless deduplication functions 506 that run in a TEE. The TEE is associated with the storage platform so that the client systems do not need to deal with deduplication. The serverless functions 506 determine whether the object has already been stored so that the object is not duplicated if it exists in the multi-tenancy, public storage backend 508. For objects that have not been stored, the proxy forwards the objects to the storage backend. The proxy may also forward the hashes with the objects to the storage system backend 508 so that copies of the fingerprints corresponding to user data blocks stored in the system are available outside the TEE.

Unless specifically stated otherwise, it is appreciated that throughout this specification that terms such as "operations," "processing," "computing," "comparing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
at least one memory device including instructions that are executable by the processing device for causing the processing device to perform operations comprising:
receiving a plurality of encrypted, incoming user data blocks for a storage platform;
decrypting, in a trusted execution environment associated with the storage platform, the plurality of encrypted, incoming user data blocks to produce unencrypted user data blocks;
producing an incoming digital fingerprint from an unencrypted user data block of the unencrypted user data blocks;
comparing, for the unencrypted user data block, the incoming digital fingerprint to existing digital fingerprints stored in the trusted execution environment to determine a presence of the incoming digital fingerprint among the existing digital fingerprints; and
adding a reference count to a data pointer that identifies an encrypted, user data block as used by a tenant of the storage platform to deduplicate the encrypted, incoming user data block based on the presence of the incoming digital fingerprint.

2. The system of claim 1, wherein the operations further comprise applying a hash function to the unencrypted user data block to produce the incoming digital fingerprint.

3. The system of claim 1, wherein the operations further comprise:
storing at least some of the plurality of encrypted, incoming user data blocks in the storage platform; and
updating the plurality of existing digital fingerprints stored in the trusted execution environment.

4. The system of claim 1, wherein the storage platform comprises a multitenancy, public storage platform.

5. The system of claim 4, wherein the existing digital fingerprints comprise digital fingerprints corresponding to tenant data blocks from a plurality of tenants.

6. The system of claim 1, wherein each of the plurality of encrypted, incoming user data blocks are received through a proxy to provide an interface protocol between a client and the storage platform, wherein the proxy further redirects the incoming user data blocks from storage locations specified in the interface protocol to the trusted execution environment.

7. A method comprising:
receiving, by a processing device, a plurality of encrypted, incoming user data blocks for a storage platform;
decrypting, by the processing device, in a trusted execution environment associated with the storage platform, the plurality of encrypted, incoming user data blocks to produce unencrypted user data blocks;
producing, by the processing device, an incoming digital fingerprint from an unencrypted user data block of the unencrypted user data blocks;
comparing, by the processing device, for the unencrypted user data block, the incoming digital fingerprint to existing digital fingerprints stored in the trusted execution environment to determine a presence of the incoming digital fingerprint among the existing digital fingerprints; and
adding, by the processing device, a reference count to a data pointer that identifies an encrypted, user data block as used by a tenant of the storage platform to deduplicate, the encrypted, incoming user data block based on the presence of the incoming digital fingerprint.

8. The method of claim 7, further comprising applying a hash function to the unencrypted user data block to produce the incoming digital fingerprint.

9. The method of claim 7, further comprising:
storing at least some of the plurality of encrypted, incoming user data blocks in the storage platform; and
updating the plurality of existing digital fingerprints stored in the trusted execution environment.

10. The method of claim 7, wherein the storage platform comprises a multitenancy, public storage platform and the existing digital fingerprints comprise digital fingerprints corresponding to tenant data blocks from a plurality of tenants.

11. The method of claim 7, wherein each of the plurality of encrypted, incoming user data blocks are received through a proxy to provide an interface protocol between a client and the storage platform, wherein the proxy further redirects the incoming user data blocks from storage locations specified in the interface protocol to the trusted execution environment.

12. A non-transitory computer-readable medium comprising program code that is executable by a processing device for causing the processing device to:
   receive a plurality of encrypted, incoming user data blocks for a storage platform;
   decrypt, in a trusted execution environment associated with the storage platform, the plurality of encrypted, incoming user data blocks to produce unencrypted user data blocks;
   produce an incoming digital fingerprint from an unencrypted user data block of the unencrypted user data blocks;
   compare, for the unencrypted user data block, the incoming digital fingerprint to existing digital fingerprints stored in the trusted execution environment to determine a presence of the incoming digital fingerprint among the existing digital fingerprints; and
   add a reference count to a data pointer that identifies an encrypted, user data block as used by a tenant of the storage platform to deduplicate the encrypted, incoming user data block based on the presence of the incoming digital fingerprint.

13. The non-transitory computer-readable medium of claim 12, wherein the program code is further executable for causing the processing device to apply a hash function to the unencrypted user data block to produce the incoming digital fingerprint.

14. The non-transitory computer-readable medium of claim 12, wherein the program code is further executable for causing the processing device to:
   store at least some of the plurality of encrypted, incoming user data blocks in the storage platform; and
   update the plurality of existing digital fingerprints stored in the trusted execution environment.

15. The non-transitory computer-readable medium of claim 12, wherein the storage platform comprises a multitenancy, public storage platform.

16. The non-transitory computer-readable medium of claim 15, wherein the existing digital fingerprints comprise digital fingerprints corresponding to tenant data blocks from a plurality of tenants.

17. The non-transitory computer-readable medium of claim 12, wherein each of the plurality of encrypted, incoming user data blocks are received through a proxy to provide an interface protocol between a client and the storage platform, wherein the proxy further redirects the incoming user data blocks from storage locations specified in the interface protocol to the trusted execution environment.

* * * * *